United States Patent
Hwang et al.

(10) Patent No.: US 10,436,440 B2
(45) Date of Patent: Oct. 8, 2019

(54) HYDROLYSIS APPARATUS FOR ORGANIC WASTE USING HYDRAULIC CRUSHING EFFECT

(71) Applicants: GST CO., LTD., Daegu (KR); Sung-Uk Hwang, Daegu (KR)

(72) Inventors: Sung-Uk Hwang, Daegu (KR); Sung-Gil Hwang, Seoul (KR)

(73) Assignees: GST CO., LTD., Daegu (KR); SUNG-UK HWANG, Daegu (KR)

(*) Notice: Subject to any disclaimer, the term of this patent is extended or adjusted under 35 U.S.C. 154(b) by 196 days.

(21) Appl. No.: 15/527,328

(22) PCT Filed: Nov. 18, 2015

(86) PCT No.: PCT/KR2015/012372
§ 371 (c)(1),
(2) Date: May 17, 2017

(87) PCT Pub. No.: WO2016/080746
PCT Pub. Date: May 26, 2016

(65) Prior Publication Data
US 2017/0328562 A1 Nov. 16, 2017

(30) Foreign Application Priority Data
Nov. 20, 2014 (KR) .................. 10-2014-0162633

(51) Int. Cl.
*B01F 13/00* (2006.01)
*B09B 3/00* (2006.01)
(Continued)

(52) U.S. Cl.
CPC .............. *F23G 5/033* (2013.01); *B01F 13/00* (2013.01); *B09B 3/00* (2013.01); *B09B 3/0083* (2013.01);
(Continued)

(58) Field of Classification Search
CPC . F23G 5/033; B01F 13/00; B09B 3/00; B09B 3/0083; B29B 17/02; H05B 3/40
(Continued)

(56) References Cited

FOREIGN PATENT DOCUMENTS

| KR | 20-0186976 Y1 | 6/2000 |
| KR | 10-0865632 B1 | 10/2008 |

(Continued)

OTHER PUBLICATIONS

International Search Report for PCT/KR2015/012372 dated Jun. 22, 2016 from Korean Intellectual Property Office.

*Primary Examiner* — Huy Tram Nguyen
(74) *Attorney, Agent, or Firm* — Revolution IP, PLLC

(57) ABSTRACT

A hydrolysis apparatus for organic waste using a hydraulic crushing effect includes: a housing having an open top surface and an inner lodging space; a reaction tank being lodged in the inner lodging space of the housing and having an open top surface and an inner space for accommodating a defined liquid chemical; a heating section connected to a bottom surface of the reaction tank and integrated into the reaction tank; and a driving means for moving the housing to put the housing in a linear reciprocating motion. The present invention has an effect to greatly reduce the physical crushing time and the dissolution time using a liquid chemical in the hydrolysis of animal carcass and other organic wastes, such as food waste, sewage/waste water sludge, animal/plant residue, and so forth, thereby increasing the work efficiency and reducing the cost.

9 Claims, 3 Drawing Sheets

(51) Int. Cl.
  *B29B 17/02*    (2006.01)
  *H05B 3/40*     (2006.01)
  *F23G 5/033*    (2006.01)
  *B29K 105/06*   (2006.01)

(52) U.S. Cl.
  CPC ............... *B29B 17/02* (2013.01); *H05B 3/40* (2013.01); *B29K 2105/06* (2013.01); *Y02W 30/622* (2015.05)

(58) Field of Classification Search
  USPC .................................................... 422/184.1
  See application file for complete search history.

(56) References Cited

FOREIGN PATENT DOCUMENTS

| | | |
|---|---|---|
| KR | 20-0447884 Y1 | 3/2010 |
| KR | 10-2012-0116212 A | 10/2012 |
| KR | 10-1331253 B1 | 11/2013 |
| KR | 10-2014-0077053 A | 6/2014 |
| KR | 10-2014-0102554 A | 8/2014 |

--Prior Art--

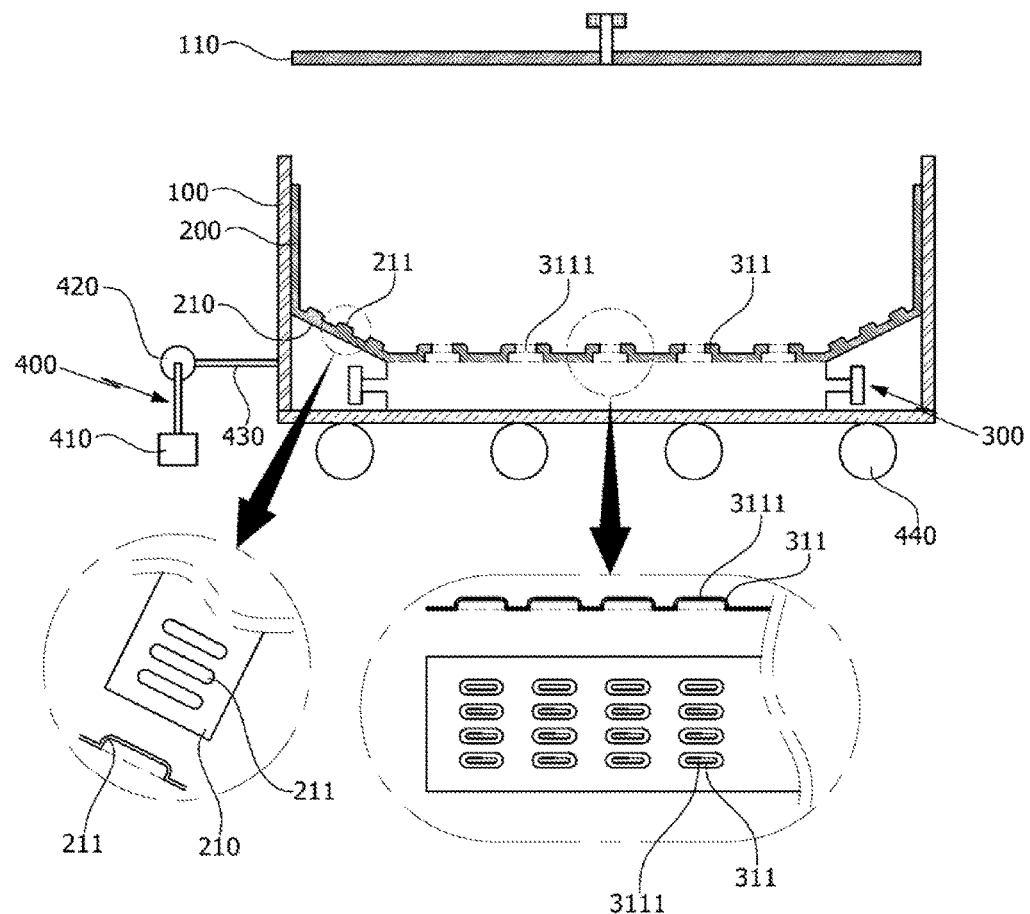
[FIG. 2]

[FIG. 3]
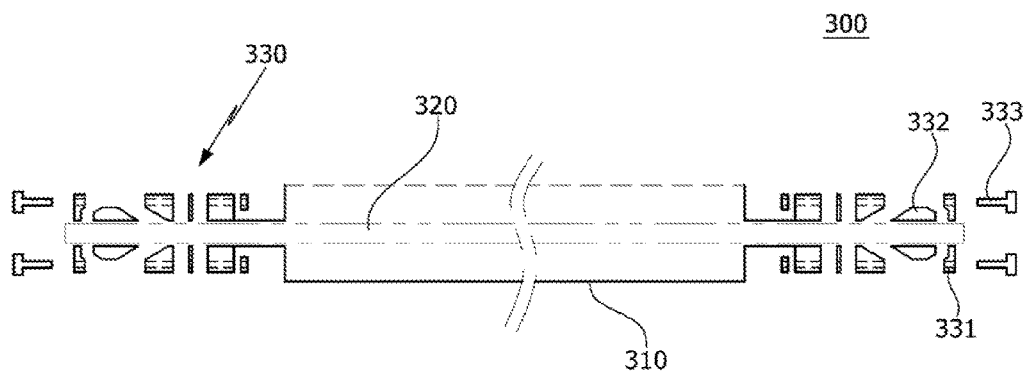
[FIG. 4]
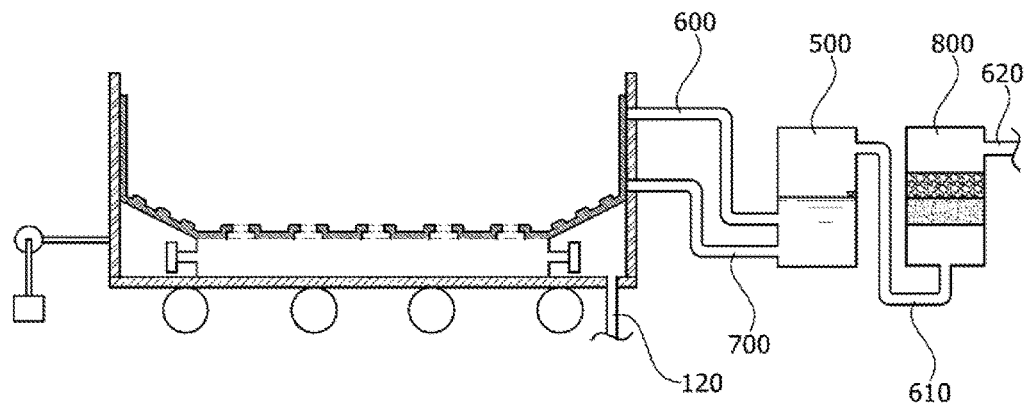

HYDROLYSIS APPARATUS FOR ORGANIC WASTE USING HYDRAULIC CRUSHING EFFECT

CROSS REFERENCE TO PRIOR APPLICATIONS

This application is a National Stage Application of PCT International Patent Application No. PCT/KR2015/012372 filed on Nov. 18, 2015, under 35 U.S.C. § 371, which claims priority to Korean Patent Application No. 10-2014-0162633 filed on Nov. 20, 2014, which are all hereby incorporated by reference in their entirety.

TECHNICAL FIELD

The present invention relates to an apparatus for organic waste using an hydraulic crushing effect, and particularly to a hydrolysis apparatus for organic waste using an hydraulic crushing effect that hydrolyzes a variety of organic waste, including food waste, sewage/waste water sludge, animal/plant residue, animal carcass, butchery waste, etc.

BACKGROUND ART

With the establishment of the clean development mechanism (CDM) to cope with climate change and the regularization of the government support policy for new renewable energy development, an active effort has been made to recycle biogas from organic wastes, such as food waste, sewage/waste water sludge, animal/plant residue, animal carcass, butchery waste, etc., through anaerobic digestion.

In addition, the biogas plants are actively being constructed and operated to produce methane gas from combined digestion of food waste and livestock sludge for combined heat and power generation.

But, the biogas plants have the difficulty in producing biogas enough to secure economic feasibility, so an urgent attempt is being made to seek a new method of increasing the product yield of biogas.

As the actual operation and research on the anaerobic digestion technique for the production of biogas have long been performed, there has been remarkable progress in the anaerobic digestion mechanism, the optimal reaction conditions, and the operation method for digestion tank.

The pretreatment process for treating organic wastes prior to their addition into the digestion tank is still in its infancy, and it is possible to stabilize the operation of the digestion tank and reduce the size of the digestion tank. Also, it is reported that the pretreatment process leads to the increased yield of the biogas. Hence, various forms of the anaerobic digestion pretreatment technique have been developed and now commercially available.

On the other hand, a hydrolysis apparatus for organic waste using a chemical (e.g., hydrochloric acid) is developed based on the idea that the organic wastes need to be converted into low molecular organic substances directly digestible by microorganisms through hydrolysis in order to produce methane gas from the anaerobic digestion of the organic wastes.

There are two known fundamental methods to enhance the rate of the chemical reactions; increasing the reactive surface area and enhancing the agitation intensity.

For this reason, the existing chemical pretreatment methods or apparatuses for organic waste make the use of a separate two-step process of performing mechanical crushing and then a chemical reaction to increase the reactive surface area and a separated process of using an agitator or performing aeration and pumping circulation to enhance the agitation intensity.

KR utility model publication No. 20-0447884 (published on Mar. 3, 2010) discloses an "apparatus for liquefaction of animal carcass", which is an apparatus for treating animal carcass using the above-described phenomenon with efficiency.

The "apparatus for liquefaction of animal carcass" is successful and now commercially available, as it completely liquefies animal carcass in a reaction time of about 6 hours or less and shows an effect of reducing the used amount of hydrochloric acid by about 30% and the cost of energy by about 30% or greater in comparison with the existing stationary apparatus for liquefaction as disclosed in KR patent publication No. 10-0865632 (published on Oct. 27, 2008) under the title of "a liquefied manure composition prepared using animal carcass and an apparatus for liquefaction of animal carcass".

In addition, the alkali hydrolysis in Example 3 of "an amino acid manure removed of foul odor and its preparation method" according to KR patent publication No. 10-1331253 (published on Nov. 19, 2013) requires a greater amount of chemical by about 200% or more and takes a longer reaction time of about 11 hours.

FIG. 1 is an illustration of the above-mentioned apparatus for liquefaction of animal carcass according to the prior art. Referring to FIG. 1, the existing apparatus for liquefaction of animal carcass adopts an indirect heating construction that a reaction tank body 10 and a heating section 20 positioned under the reaction tank body 10 are separated from each other by a separation barrier, where the inner surface of the reaction tank body 10 is coated with a chemical-resistant material showing a resistance to a liquefying chemical 11.

With the use of the indirect heating construction, it is impossible to apply a thick chemical-resistant coating to the inner surface of the reaction tank body 10 in consideration of the heat transfer efficiency of the heating section 20.

To solve this problem, the conventional apparatus uses a ceramic coating, a Teflon coating, or a PP coating to the inner surface of the reaction tank body 10. But, the coated surface of the reaction tank body 10 is readily broken by the frictional abrasion as a result of the generation of shock wave and the movement of animal carcass 12 and more severely damaged by the liquefying chemical 12, leading to the need of replacing the whole apparatus.

As the ceramic coating of the reaction tank body 10 is particularly susceptible to shock, the indirect heating construction of FIG. 1 with a chemical-resistant coating based on a plastic material has the difficulty of applying high temperature to the heating section 20. Thus, the heating section 20 is necessarily maintained at low temperature of about 150° C. or below in consideration of the thermal stability and mechanical strengths of the plastic material.

It is therefore difficult to rapidly increase the internal temperature of the reaction tank body 10 and reduce the reaction time by raising the temperature of the heating section 20 or to manufacture a large-capacity industrial reaction tank that uses lots of energy for heating.

This may also be problematic in developing a pretreatment apparatus for liquefaction in a large-capacity facility for treatment of food waste and sewage/waste water sludge other than animal carcass.

Further, the hydraulic crushing and agitation shows a successful result when the inside of the reaction tank is spacious enough to allow the movement of a fluid, but otherwise nearly ineffective.

When the reaction tank is filled with bulky solids such as animal carcass, for example, it has lots of space between the solids and thus allows the free movement of the aqueous chemical solution, resulting in a great effect through hydraulic crushing and agitation even with a small amount of the chemical.

Contrarily, when the reaction tank is filled with small solids such as butchery waste consisting of pig hair, toenails, or the like and nearly free from space, it is impossible to induce the movement of a fluid or the generation of shock wave in the reaction tank filled with the chemical and driven to operation, nearly having no effect of liquefying the solids even with an elapse of considerably long time.

Besides, food waste and sewage/waste water sludge produced in a large quantity as industrial organic wastes cause the same problem as specified above, so it is difficult to use the existing reaction tank in the hydrolysis apparatus for liquefaction.

Lastly, the inside of the reaction tank body is present as one integrated space, so the concentration and temperature of the chemical become uniform all in the reaction tank on the instant.

Accordingly, the dilution of the chemical and the change of properties of the aqueous solution that occur as a result of the liquefaction have an instant effect to make the difference in the reaction rate.

For example, the liquefaction of frozen animal carcass in the winter season has a considerably long reaction time due to the low reaction rate.

PRIOR ART DOCUMENTS

Patent Documents (Patent Document 1) KR patent publication No. 10-0865632 (published on Oct. 27, 2008)
(Patent Document 2) KR utility model publication No. 20-0447884 (published on Mar. 3, 2010)
(Patent Document 3) KR patent publication no. 10-1331253 (published on Nov. 19, 2013)

DISCLOSURE OF INVENTION

To solve the problems with the prior art, it is an object of the present invention to provide a hydrolysis apparatus for organic waste using a hydraulic crushing effect that uses hydrolysis to treat animal carcass and other organic wastes, such as food waste, sewage/waste water sludge, animal/plant residue, and so forth.

In accordance with the present invention derived to achieve the object of the present invention, there is provided a hydrolysis apparatus for organic waste using a hydraulic crushing effect that includes: a housing having an open top surface and an inner lodging space; a reaction tank being lodged in the inner lodging space of the housing and having an open top surface and an inner space for accommodating a defined liquid chemical "L"; a heating section connected to a bottom surface of the reaction tank and integrated into the reaction tank; and a driving means for moving the housing to put the housing in a linear reciprocating motion.

The reaction tank has an upwardly slanted surface set at a defined oblique angle in both side bottom ends thereof.

The slanted surface has a corrugated sheet on the top surface thereof.

The reaction tank is made of a glass fiber reinforced plastic (FRP) material.

The reaction tank has a thickness of about 15 mm or greater.

The heating section includes: a case having an inner lodging space; at least one heating rod being lodged in the inner lodging space of the case to go all the way through the case horizontally and positioned to have both ends thereof projecting from both ends of the case; and a fastening means allowing both ends of the heating rod projecting from both ends of the case to be fixed to the case. The case has a plurality of projections on the top surface thereof, and each projections has a through hole going all the way through the bottom surface of the reaction tank.

The heating rod is an electric heater having an outer circumference thereof coated with a Teflon tube.

The heating rod is a steam pipe.

The fastening means has a flange, a sealing socket, and a fastening bolt.

The driving means includes: a driving motor; a crankshaft being connected to the driving motor to convert a rotational motion by the driving motor into a linear reciprocating motion; a connecting rod having one end thereof connected to the crankshaft and the other end thereof connected to the lateral surface of the housing to transfer the linear reciprocating motion converted by the crankshaft to the housing; and a plurality of rollers installed under the bottom surface of the housing.

The hydrolysis apparatus for organic waste using a hydraulic crushing effect further includes: a water collector accommodating water; a first gas discharge pipe providing a connection between the reaction tank and the water collector to transfer a gas generated from the reaction tank to the water collector; a water return pipe providing a connection between the reaction tank and the water collector to return the water of the water collector to the reaction tank; and a gas purifier for neutralizing and deodorizing the gas released from the water collector and releasing the neutralized and deodorized gas to the outside thereof. Out of the gases moved to the water collector through the first gas discharge pipe, the hydrochloric acid gas is dissolved in the water and water vapor is condensed in the water to raise the surface of the water, so the water pressure increased by the raised surface of the water forces the water dissolving the hydrochloric acid gas to return to the reaction tank via the water return pipe. Out of the gases released from the water collector, the hydrochloric acid gas is neutralized with a calcareous layer positioned in the gas purifier, and the organic gases are deodorized with activated carbon positioned in the gas purifier.

The housing further includes a lid for covering the open top thereof.

Effects of the Invention

The present invention has an effect to greatly reduce the physical crushing time and the dissolution time using a liquid chemical in the hydrolysis of animal carcass and other organic wastes, such as food waste, sewage/waste water sludge, animal/plant residue, and so forth, thereby increasing the work efficiency and reducing the cost.

BRIEF DESCRIPTIONS OF DRAWINGS

The accompanying drawings of this specification are given to describe the preferred embodiments of the present invention together with the detailed description of the present invention for the sake of better understanding of the technical conceptions of the present invention and not construed to limit the scope of the present invention.

FIG. 2 is a partial enlarged cross-section diagram showing a hydrolysis apparatus for organic waste using a hydraulic crushing effect in accordance with one embodiment of the present invention.

FIG. 3 is a cross-section diagram showing a heating section of FIG. 2.

FIG. 4 is a cross-section diagram showing a hydrolysis apparatus for organic waste using a hydraulic crushing effect in accordance with another embodiment of the present invention.

BEST MODES FOR CARRYING OUT THE INVENTION

Figure 1:
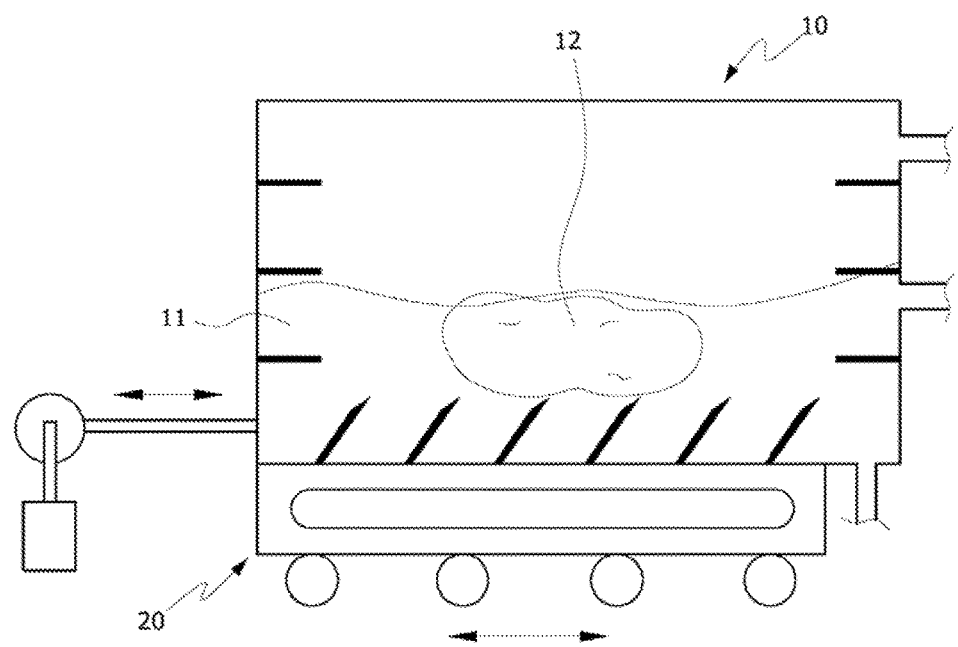
FIG. 1 is a diagram of a conventional apparatus for liquefaction of animal carcass.

Hereinafter, a detailed description will be made to the preferred embodiments of a hydrolysis apparatus for organic waste using a hydraulic crushing effect with reference to the accompanying drawings.

FIG. 2 is a partial enlarged cross-section diagram showing a hydrolysis apparatus for organic waste using a hydraulic crushing effect in accordance with one embodiment of the present invention, and FIG. 3 is a cross-section of a heating section of FIG. 2.

Referring to FIGS. 2 and 3, a hydrolysis apparatus for organic waste using a hydraulic crushing effect in accordance with one embodiment of the present invention consists of a housing 100, a reaction tank 200, a heating section 300, and a driving means 400, which components will be described in detail as follows.

Firstly, a description will be given as to a hydrolysis apparatus for organic waste using a hydraulic crushing effect that performs crushing and agitation and hydrolysis at once in a same reaction tank.

The term "hydraulic crushing" as used herein refers to a phenomenon that when a mixture of solids and a fluid undergoes a rapid change of speed and direction, the fluid crashes onto the solids to generate shock wave due to the change of momentum and crushes the solids with the shock wave.

For instance, when a reaction tank filled with a fluid put into a rapid change of direction in its state of back-and-forth (to-and-fro) reciprocating motion under certain conditions, the fluid is brought to a downward rush due to inertia while sliding to its direction and turned to the opposite direction, ending up producing shock waves to cause crushing and agitation.

In other words, this occurs in the same way as large waves crash the rocks on the seashore.

The housing 100 is open on the top and has a defined inner lodging space in the cubic or rectangular form. The housing 100 is also made of a metal or non-metal material.

The housing 100 may further have a lid 110 partially removable so that an organic waste "O", including food waste, sewage/waste water sludge, animal/plant residue, animal carcass, butchery waste, etc., can be put into the inner space of the reaction tank 200 through the top opening of the housing 100.

The reaction tank 200 is lodged in the inner lodging space of the housing 100. The reaction tank 200 is open on the top and has an inner space to accommodate a liquid chemical "L" together with the organic waste "O", including food waste, sewage/waste water sludge, animal/plant residue, animal carcass, butchery waste, etc. Preferably, the liquid chemical "L" is a chemical containing an acid or a base.

Namely, the liquid chemical "L" reacts with the organic waste "O" in the reaction tank 200 to liquefy the organic waste "O".

The reaction tank 200 may further have a separate discharge pipe 120 through which the organic waste "O" can be discharged from the housing 100.

In this regard, the acid as used herein may include hydrochloric acid, sulfuric acid, phosphoric acid, nitric acid, hydrofluoric acid, etc., and the base as used herein may include sodium hydroxide, potassium hydroxide, calcium hydroxide, ammonium hydroxide, etc.

Preferably, the reaction tank 200 is made of a glass fiber reinforced plastic (also known as FRP) material and has a thickness of about 15 mm or greater.

This is to enhance the mechanical strengths and the corrosion resistance to the chemical. When compared with the existing construction that a coating is applied to the reaction tank 200 made of a metal, the novel construction of forming the reaction tank 200 using a glass fiber reinforced plastic (FRP) material can make the reaction tank 200 considerably light and reduce lots of energy consumed to drive the reaction tank 200.

This makes a considerably great effect particularly in manufacturing a large-capacity industrial apparatus for liquefaction. Due to the low thermal conduction rate of the glass fiber reinforced plastic (FRP), the FRP-based reaction tank 200 has the higher insulating effect than the existing metal-based reaction tank, to reduce the energy loss caused by the radiation of heat and thus requires less energy consumption for maintaining the reaction temperature.

The reaction tank 200 has an upwardly slanted surface 210 set at a defined oblique angle in both side bottom ends, and the slanted surface 210 may have a corrugated sheet 211 on its top surface.

This structure of the reaction tank is problematic in that the space between the solids in the reaction tank is not large enough to make a hydraulic crushing effect when the reaction tank of the present invention filled with pork hair or food waste is put into operation.

In this case, it is necessary to fill the reaction tank with a fluid in such a large amount enough to crash the inner wall of the reaction tank with its weight and generate shock waves in order to make a hydraulic crushing effect.

For example, the liquid chemical is added as much as about one fifth of the reaction tank in volume in the conventional liquefaction process for animal carcass, while it has only to be added as much as up to about two thirds of the reaction tank filled with pork hair to cause a liquefaction reaction under the reaction conditions optimized so that the shock wave generated from the crash of the liquid onto the wall surface of the reaction tank can be perceived from the outside of the reaction tank.

As the reaction tank is filled with such a large amount of the liquid chemical, it requires a high cost of the liquid chemical and also consumes more energy to heat and operate the machinery, causing a rise of the operation cost.

To solve this problem, the reaction tank has slanted surfaces so as to use only just a smaller amount of the liquid chemical to fill up to a defined height in the reaction tank, reducing the used amount of the liquid chemical and preventing a loss of energy occurring at the right-angled corners when the liquid chemical runs up along the inner wall side of the reaction tank in its state of changing the direction of the reciprocating motion. Consequently, the liquid chemical rises higher in the reaction tank to increase the hydraulic crushing effect so that the liquefaction reaction can occur effectively even with a smaller amount of the liquid chemical filling up to about one half the height of the reaction tank.

Such a structure promotes the effect of increasing the energy cost and reducing the use of the chemical according to the presence of the slanted surfaces with an increase in the size of the reaction tank.

On the other hand, the slanted surface 210 has a structure in the form of a corrugated sheet on its top surface, so the corrugated sheet 211 acts as a buffer against the strong impacts on the slanted surface 210 to protect the slanted surface 210.

The heating section 300 is coupled to the bottom surface of the reaction tank 200 and integrated into the reaction tank 200 to supply with a heat required to the reaction between the organic waste "O" and the liquid chemical "L". In this regard, the heating section 300 controls the reaction temperature in the reaction tank maintained at about 80 to 95° C.

The heating section 300 has a case 310, a heating rod 320, and a fastening means 330.

The present invention improves the conventional indirect heating system into an innovative heat transfer system, while the conventional indirect heating system heats up the reaction tank 200 consisting of a glass fiber reinforced plastic (FRP) wall with the heating section 300 provided on the bottom surface of the reaction tank 200 made of an FRP material with low thermal conductivity and having a large thickness of about 15 mm or greater.

The case 310 has a lodging space inside and a plurality of projections 311 on its top surface, and each projection 311 has a through hole 3111 that goes all the way through the bottom surface of the reaction tank 200. It is shown that the bottom surface of the reaction tank 200 has the same construction of the top surface of the case 310.

The heating rod 320 provided in plural form goes through the case 310 horizontally and is lodged in the inner space of the case 310 so that either end of the heating rod 320 projects from either side end of the case 310.

Preferably, the heating rod 320 is either one of an electric heater of which the outer circumference is coated with a Teflon tube, or a steam pipe.

The fastening means 330 enables both ends of the heating rod 320 projecting from both ends of the case 310 to be fixed to the case 310. The fastening means 330 has a flange 331, a sealing socket 332, and a fastening bolt 333.

When it comes to the heat transfer in the reaction tank 200, a direct heat transfer occurs from the inside of the case 310 of the heating section 300 to the liquid chemical "L" through an electric heater coated with a Teflon tube or a steam pipe via a plurality of the flange 331 attached to the heating rod 320, thereby solving the problem in regards to the low heat transfer of the reaction tank 200. This system is superior in the heat transfer efficiency to the existing direct heating system.

The electric heater coated with a Teflon tube or the steam pipe is attached to the case 310 of the heating section 300 via the sealing socket 332 and the fastening bolt 333 specially manufactured together with the flange 331.

In this regard, the fastening form that clamps both ends of the electric heater or the steam pipe prevents a build-up of scales forming on the electric heater or the steam pipe to increase the life span of the electric heater or the steam pipe and enhance the heat transfer efficiency.

Upon the housing 100 rapidly changing the direction in its state of the reciprocating motion, the shock wave similar to that occurring upon the collision with an object is imparted to the housing 100 and also to the electric heater or the steam pipe, and the electric heater or the steam pipe of which the both ends are fixedly clamped cause the stronger vibrations, making it difficult to form a build-up of scales on the surface.

The effect of preventing a build-up of scales is more evident in a large-capacity industrial hydrolysis apparatus for organic waste, considering that many attempts are also made to eliminate a build-up of scales on the surface of an electric heater or a steam pipe used in a general boiler.

The reaction tank 200 is separated from the heating section 300 having the heating rod 320 that is an electric heater or a steam pipe by a separation barrier, and the bottom surface of the reaction tank 200 is separated from the top surface of the case 310 of the heating section 300 by the same separation barrier.

The separation barrier consists of projections 311 extending upward and controls the flow of a substance transfer through a long and narrow through hole 3111.

The flow of a substance restricted by the separation barrier causes deviation in the concentration of the liquid between the portion under the separation barrier and the reaction tank 200, making the temperature of the portion under the separation barrier higher than that of the reaction tank 200.

With this structure, the liquid with the greater molecular weight partially liquefied by the liquid chemical "L" settles down and rapidly becomes degraded under high-temperature conditions under the separation barrier.

Particularly, the large-capacity reaction tank 200 may have the smaller heating section 300 under the separation barrier than the reaction tank 200 and use a standardized electric heater or steam pipe, thereby reducing the production cost of the reaction tank or enabling a design of the reaction tank to have a variety of structure.

In the manufacture of a large-capacity industrial hydrolysis apparatus for organic waste, the conventional indirect heating system with a larger reaction tank has the heating section with longer length and greater area but still low height, causing the difficulty in achieving a uniform heat transfer when the heat medium is heated from the one end of the heating section, and damaging the reaction tank with heat accumulated at specific portion, which problems are hard to solve.

Accordingly, the structure having the heating rod independently installed as in the present invention is greatly advantageous.

The driving means 400 moves the housing 100 so that the housing 100 is put in a linear reciprocating motion.

The driving means 400 has a driving motor 410, a crankshaft 420, a connecting rod 430, and rollers 440.

A plurality of rollers 440 are installed under the bottom surface of the housing 100 to move the housing 100 in the back-and-forth (to-and-fro) direction.

Preferably, a plurality of the rollers 440 are positioned in the width direction on both ends of the bottom surface of the housing 100 and made of a metal having a melting temperature of about 100° C. or above in order to prevent its melting down with the heat generated from the heating section 300.

The driving means 400 is installed on the one side surface of the housing 100 to put the housing 100 in a back-and-forth (to-and-fro) motion.

When the housing 100 is moving in a back-and-forth (to-and-fro) direction, the organic waste "O" irregularly crashes the front and rear sides in the reaction tank 200 and becomes crushed physically.

With the organic waste "O" crushed, the contact area between the organic waste "O" and the liquid chemical "L" is increased to raise the liquefaction rate of the organic waste "O". Namely, even when the limit is put to the concentration and used amount of the liquid chemical "L" and the reaction temperature, the driving means 400 acts to enhance the agitation state of the organic waste "O", so the liquefaction rate does not lower in relation to the case where no limit is imparted.

The housing 100 is put in a reciprocating motion preferably at a speed of about 30 to 60 cycles per minute in a distance range of about 20 to 40 cm in order to enhance the agitation state of the organic waste "O", more preferably at a speed of about 30 cycles per minute at a distance of about 30 cm. In this case, the agitation force is strong enough to make the surface of the liquid chemical "L" surge up to about 60 cm or higher.

In order to perform the above-described functions, the driving means 400 includes a driving motor 410, a crankshaft 420, and connecting rod 430.

The crankshaft 420 is connected to the driving motor 410 to convert the rotational motion driven by the driving motor 410 into a linear reciprocating motion. The connecting rod 430 transfers the linear reciprocating motion converted by the crankshaft 420 to the housing 100.

The connecting rod 430 has the one end connected to the crankshaft 420 and the other end connected to the lateral surface of the housing 100.

FIG. 4 is a cross-section diagram showing a hydrolysis apparatus for organic waste using a hydraulic crushing effect in accordance with another embodiment of the present invention.

Referring to FIG. 4, the hydrolysis apparatus for organic waste using a hydraulic crushing effect may further include a water collector 500 collecting water, a first gas discharge pipe 600 connecting the reaction tank 200 to the water collector 500, and a water return pipe 700.

The gas generated from the reaction of the organic waste "O" and the liquid chemical "L" mostly consists of hydrochloric acid gas, water vapor, and other organic gases including volatile organic compounds (VOCs).

The first gas discharge pipe 600 is provided as a passage for these gases to move from the reaction tank 200 to the water collector 500. Out of the gases, the hydrochloric acid gas is dissolved in the water, the water vapor is condensed with the water, and the other organic gases (VOCs) are insoluble in water and collected in a space other than the water-containing space.

The first gas discharge pipe 600 provides a connection designed to prevent the water contained in the water collector 500 from flowing back to the reaction tank 200. The first gas discharge pipe 600 is made of an elastic material so that the linear reciprocating motion of the housing 100 does not make an effect on the water collector 500.

The water return pipe 700 acts as a passage for the water dissolving the hydrochloric acid gas to go back to the reaction tank 200.

As described above, the water vapor generated from the reaction tank 200 is condensed in the water, in which case the surface of the water rises to increase the water pressure that helps the water flow from the water collector 500 back to the reaction tank 200.

The water return pipe 700 provides a connection designed to prevent the liquid chemical "L" of the reaction tank 200 from entering the water collector 500. The water return pipe 700 is made of an elastic material so that the linear reciprocating motion of the housing 100 does not make an effect on the water collector 500.

When the hydrolysis apparatus for organic waste according to the present invention includes the water collector 500, the first gas discharge pipe 600 and the water return pipe 700 as described above, the liquid chemical "L" discharged from the reaction tank 200 can return to the reaction tank 200. It is thus possible to decrease the amount of the liquid chemical L used to liquefy the organic waste "O" and reduce the cost to purchase the liquid chemical "L".

Preferably, the water collector 500 is connected to a gas purifier 800 for neutralizing and deodorizing the gas discharged from it.

The water collector 500 contains water-insoluble organic gases and a slight of hydrochloric acid gas in the water.

The organic gases and a slight of hydrochloric acid gas are sent to the gas purifier 800 through a second gas discharge pipe 610.

A slight of the hydrochloric acid gas entering the gas purifier 800 passes through a calcareous layer in the gas purifier 800 and becomes neutralized into calcium chloride. The organic gases sent to the gas purifier 800 is deodorized while passing through activated carbon granules positioned on the top of the calcareous layer.

The calcium chloride and the deodorized organic gases are exhausted to the outside through a third gas discharge pipe 620. Preferably, the calcareous layer consists of granular quicklime (CaO) or lime.

Hereinafter, a description will be given as to the operation of the hydrolysis apparatus for organic waste using a hydraulic crushing effect according to the preferred embodiments of the present invention.

Firstly, an operator puts an organic waste "O", including food waste, sewage/waste water sludge, animal/plant residue, animal carcass, and butchery waste, and an appropriate amount of liquid chemical "L" into the reaction tank 200 and applies electric power to the heating rod 320.

When the temperature of the liquid chemical "L" rises to about 80 to 95° C., the operator puts the driving motor 410 into operation and drives the housing 100 to make a linear reciprocating motion.

The linear reciprocating motion of the housing 100 causes the organic waste "O" to move irregularly in the reaction tank 200, so the organic waste "O" is physically crushed and liquefied through the reaction with the liquid chemical "L" at the same time.

The hydrochloric acid gas, the water vapor, and other organic gases generated from the liquefaction reaction of the organic waste "O" flow into the water collector 500.

A part of the hydrochloric acid gas entering the water collector 500 is dissolved in water and sent to the reaction tank 200, and the rest goes to the gas purifier 800.

The water vapor is condensed in the water collector 500 to raise the water surface of the water, and the organic gases are sent to the gas purifier 800.

The hydrochloric acid gas sent to the gas purifier 800 is neutralized with the calcareous layer and exhausted to the outside of the gas purifier 800, and the organic gases in the gas purifier 800 are deodorized by the activated carbon granules and released to the outside of the gas purifier 800.

Finally, when the liquefaction of the organic waste "O" is put to an end, the liquids remaining in the reaction tank 200 are discharged from the housing 100 through the discharge pipe.

The foregoing description of the preferred embodiments of the invention is presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A hydrolysis apparatus for organic waste using a hydraulic crushing effect, comprising:
   a housing 100 having an open top surface and an inner lodging space;
   a reaction tank 200 being lodged in the inner lodging space of the housing 100 and having an open top surface and an inner space for accommodating a defined liquid chemical "L";
   a heating section 300 connected to a bottom surface of the reaction tank 200 and integrated into the reaction tank 200; and
   a driving means 400 for moving the housing 100 to put the housing 100 in a linear reciprocating motion.

2. The hydrolysis apparatus for organic waste using a hydraulic crushing effect as claimed in claim 1, wherein the reaction tank 200 has an upwardly slanted surface 210 set at a defined oblique angle in both side bottom ends thereof.

3. The hydrolysis apparatus for organic waste using a hydraulic crushing effect as claimed in claim 2, wherein the slanted surface 210 has a corrugated sheet 211 on the top surface thereof.

4. The hydrolysis apparatus for organic waste using a hydraulic crushing effect as claimed in claim 1, wherein the reaction tank 200 is made of a glass fiber reinforced plastic (FRP) material and has a thickness of 15 mm or greater.

5. The hydrolysis apparatus for organic waste using a hydraulic crushing effect as claimed in claim 1, wherein the heating section 300 comprises:
   a case 310 having an inner lodging space;
   at least one heating rod 320 being lodged in the inner lodging space of the case 310 to go all the way through the case 310 horizontally and positioned to have both ends thereof projecting from both ends of the case 310; and
   a fastening means 330 having a flange 331, a sealing socket 332, and a fastening bolt 333 to enable both ends of the heating rod 320 projecting from both ends of the case 310 to be fixed to the case 310,
   wherein the case 310 has a plurality of projections 311 on the top surface thereof, wherein each projections 311 has a through hole 3111 going all the way through the bottom surface of the reaction tank 200.

6. The hydrolysis apparatus for organic waste using a hydraulic crushing effect as claimed in claim 5, wherein the heating rod 320 is either one of an electric heater having the outer circumference thereof coated with a Teflon tube, or a steam pipe.

7. The hydrolysis apparatus for organic waste using a hydraulic crushing effect as claimed in claim 1, wherein the driving means 400 comprises:
   a driving motor 410;
   a crankshaft 420 being connected to the driving motor 410 to convert a rotational motion by the driving motor 410 into a linear reciprocating motion;
   a connecting rod 430 having one end thereof connected to the crankshaft 420 and the other end thereof connected to the lateral surface of the housing 100 to transfer the linear reciprocating motion converted by the crankshaft 420 to the housing 100; and
   a plurality of rollers 440 installed under the bottom surface of the housing 100.

8. The hydrolysis apparatus for organic waste using a hydraulic crushing effect as claimed in claim 1, further comprising:
   a water collector 500 accommodating water;
   a first gas discharge pipe 600 providing a connection between the reaction tank 200 and the water collector 500 to transfer a gas generated from the reaction tank 200 to the water collector 500;
   a water return pipe 700 providing a connection between the reaction tank 200 and the water collector 500 to return the water of the water collector 500 to the reaction tank 200; and
   a gas purifier 800 for neutralizing and deodorizing the gas released from the water collector 500 and releasing the neutralized and deodorized gas to the outside thereof,
   wherein out of the gases moved into the water collector 500 through the first gas discharge pipe 600, a hydrochloric acid gas is dissolved in the water and water vapor is condensed in the water to raise the surface of the water, so water pressure increased by the raised surface of the water forces the water dissolving the hydrochloric acid gas to return to the reaction tank 200 via the water return pipe 700,
   wherein out of the gases released from the water collector 500, hydrochloric acid gas is neutralized with a calcareous layer positioned in the gas purifier 800 and organic gases are deodorized with activated carbon positioned in the gas purifier 800.

9. The hydrolysis apparatus for organic waste using a hydraulic crushing effect as claimed in claim 1, wherein the housing 100 further comprises a lid 110 for covering the open top thereof.

* * * * *